United States Patent [19]

Schag et al.

[11] 3,740,644
[45] June 19, 1973

[54] APPARATUS FOR IDENTIFYING INDIVIDUAL WIRES OF A MULTI-WIRE CABLE

[75] Inventors: Ronald H. Schag, Orange; David M. Landis, Fullerton, both of Calif.

[73] Assignee: Thomas & Betts Corporation, Elizabeth, N.J.

[22] Filed: June 15, 1970

[21] Appl. No.: 46,424

[52] U.S. Cl. .................... 324/66, 324/51
[51] Int. Cl. ............... G01r 19/16, G01r 31/02
[58] Field of Search ............ 324/51, 66, 73, 133; 340/324

[56]  References Cited
UNITED STATES PATENTS

| | | | |
|---|---|---|---|
| 2,981,886 | 4/1961 | Beck | 324/54 |
| 3,183,439 | 5/1965 | Rosinek | 324/133 X |
| 3,288,945 | 11/1966 | McNair et al. | 324/66 X |
| 3,609,538 | 9/1971 | Schag | 324/66 |
| 1,738,710 | 12/1929 | Jones | 324/66 |
| 2,953,744 | 9/1960 | Miller et al. | 324/66 |
| 2,982,880 | 5/1961 | Klipstein | 340/324 X |
| 3,437,928 | 4/1969 | Baker et al. | 324/133 |
| 3,430,135 | 2/1969 | Mullen | 324/51 |
| 2,360,170 | 10/1944 | Smith | 324/66 |
| 3,250,992 | 5/1966 | Cronkite et al. | 324/66 |
| 3,252,088 | 5/1966 | Palmer | 324/66 |

FOREIGN PATENTS OR APPLICATIONS 1,543,963  10/1968  France ................. 324/66

Primary Examiner—Gerard R. Strecker
Attorney—David Teschner and Jesse Woldman

[57] ABSTRACT

A wire detector for determining a pre-established designation of a wire in a random bundle of wires forming a cable and attached to a cable connector at one end thereof comprising, a means for receiving said connector for connecting each wire to an encoding network to cause a signal from a particular wire randomly contacted to illuminate a display for designating that wire. The detector incorporates a capability for detecting specific wires in the bundle by excluding all other wires from electronic consideration and is further equipped with a sensitive circuit and an appropriate signal source for performing the detection of a wire by contact and conduction through the body of a user.

15 Claims, 6 Drawing Figures

PATENTED JUN 19 1973 3,740,644

INVENTOR.
RONALD H. SCHAG
DAVID M. LANDIS
BY
GEORGE F. BETHEL

INVENTOR.
RONALD H. SCHAG
DAVID M. LANDIS

BY

GEORGE F. BETHEL

INVENTOR.
RONALD H. SCHAG
DAVID M. LANDIS
BY
GEORGE F. BETHEL

APPARATUS FOR IDENTIFYING INDIVIDUAL WIRES OF A MULTI-WIRE CABLE

BACKGROUND OF THE INVENTION

1. Field of the Invention

This invention lies within the art of searching, detecting, and displaying a designation of a wire within a bundle of wires.

2. Description of the Prior Art

Electrical equipment is oftentimes wired with a multiplicity of wires which are soldered, wrapped or crimped on specifically designated terminals. The terminals may be connected separately to discretely designated terminals at one end of a cable and affixed to a connector at the other end. In other instances the terminals can be connected at either end to a connector which is to be plugged into an accommodating receptacle for making a series of removable electrical connections between two points.

It is customary to predesignate wires emanating from one particular area or point so that they can be identified as a remote point to which they are to be connected or soldered. Oftentimes the remote point is substantially removed from where the wires originate. Thus, when the wires are placed in a large cable or bundle, they are difficult to recognize.

Prior methods of designating wires have been by means of colors, numbers, or other marking symbols or tags. As can be appreciated, when there are a great multiplicity of wires within a bundle, the identification scheme can be confusing and not effectuate an appropriate and facile determination of the wire designations. This has been particularly true when a large bundle of wires has been connected to a plurality of connection points and led in bundle form, a harness or a conduit to a distant location for connection in a predesignated manner.

Prior art methods for determining the designation of a particular wire in a large bundle are cumbersome at best. Some methods rely upon electrically contacting a buzzer at the loose end of a wire in a bundle and completing an electrical loop through the cable such that the buzzer will sound, when the loop has been closed. Other methods involve contacting a wire at a loose end of a bundle to a filament lamp and completing an electrical loop thereby illuminating the lamp.

As can be appreciated, the foregoing methods are time consuming and repetitious, and must be carried out by the tedious process of elimination. For example, in a bundle of a hundred wires when the designation of each wire is sought, one would have to make contact with each individual wire an average of 29 times for a total of approximately 2,900 individual contacts to identify only 100 wires. The foregoing methods of determining the designation of a wire in a loose bundle or cable are not only time consuming but inaccurate.

To effectuate prior art methods of wire identification and designation, it is oftentimes necessary to strip the ends of the wire to make contact. Some methods employ clip leads which oftentimes are driven through the insulation of a wire, which can substantially damage the wire. Even if a clip lead is used at the end of a stripped piece of wire, it can severely damage the wire by virtue of the abrasive or cutting action of a clip lead.

Other methods have been utilized to designate a wire by means of a probe. In some cases the probe is used to penetrate a bundle of wires so that an induced current can flow through the probe and create a signal to designate a wire. Other probes utilize and rely upon a sharp point to penetrate the insulation of a wire in order to provide a completed circuit for the designation of that particular wire which is penetrated. Such methods damage the insulation of a wire as well as oftentimes fatiguing them in an intolerable manner.

The instant invention overcomes the foregoing deficiencies of the prior art, as well as many others which have not been enumerated. The invention enables one to identify a predesignated wire in a loose bundle by merely touching the wire with the finger.

This invention also enables a discrete and specific identification of a particular wire within a bundle of wires by causing only the specific wire to produce a display. To cause the specific display, the invention incorporates a selection device which enables one to select a particular predesignated wire and locate that wire within a bundle by way of a readout system which functions in connection with the invention hereof.

SUMMARY OF THE INVENTION

This invention comprises apparatus for displaying a predesignated symbol of a wire by means of a readout which displays a digital or symbolic representation for the wire sought. The invention accomplishes the display be means of an electronically encoded network and support apparatus which causes a signal received from a bundle of wires to register and display a designatory symbol for a particular wire. The encoding circuitry subdivides a signal in a discriminatory manner to provide balanced electrical signals to the appropriate display drivers. A given display driver causes a visual display to show the appropriate symbol which identifies in part the predesignated wire.

The electrical current received by the encoding circuitry is provided by a low level source in contact with the loose end of a wire to be detected. The low level source can be conducted through the wire by means of body contact for operation of the invention. Body contact by way of a finger or hand conducts a sufficient current to complete a circuit through a novel wrist strap hereof which is utilized to conduct the low level current source from the invention. By merely handling a bundle of wires in a normal manner such as one would when picking up a wire, a designation of a wire can be determined without the need for a special contacting medium, clips, probes, or other cumbersome apparatus.

To facilitate the identification of a wire designation, it is merely necessary to contact any one of the wires and a symbolic representation of that wire will be visually displayed.

Additionally, the invention incorporates a feature whereby a display of only those wires specifically sought in a bundle can be obtained by means of a selector capability in this invention. More specifically, the invention allows a particular predesignated symbol to be set as to the display elements of the invention. Thereafter, only when the particular wire of such designation has been contacted, will the display light.

In summation, this invention permits the random selection of any wire within a bundle of wires to be displayed, and additionally provides a display of only one distinct predesignated wire.

DESCRIPTION OF THE PREFERRED EMBODIMENTS

Figure 1:
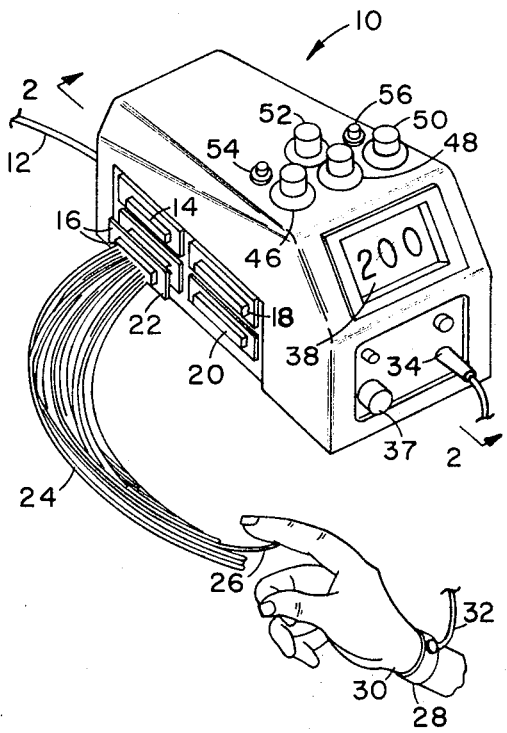
FIG. 1 shows a perspective view of the instant invention with contact being made through the hand and wrist of a user.

Looking specifically at FIG. 1, a view is shown of a cable detector 10 embodying this invention. The detector 10 has a power cord 12 leading thereinto for purposes of serving the detector 10 with its power needs. The power supplied through the cord 12 can be a standard 60 cycle 110 volt alternating current.

Along one side of the detector are a series of sockets or receptacles 14, 16, 18 and 20 which receive a plug 22 having a series of wires in a bundle 24. Each discrete wire forming the bundle 24 usually has a particular representative symbol, or other suitable designation for identification. In the instant case, the wires have numerical designations which are used to identify the wires for connection to a specifically designated point where the wire is to be soldered, wrapped or crimped. In the embodiment of FIG. 1, a discrete wire 26 is shown being contacted by the index finger of a user. The user of the device by contacting the wire 26 causes the conduction of a low level electrical current through a portion of his body into the detector 10.

Figure 5:
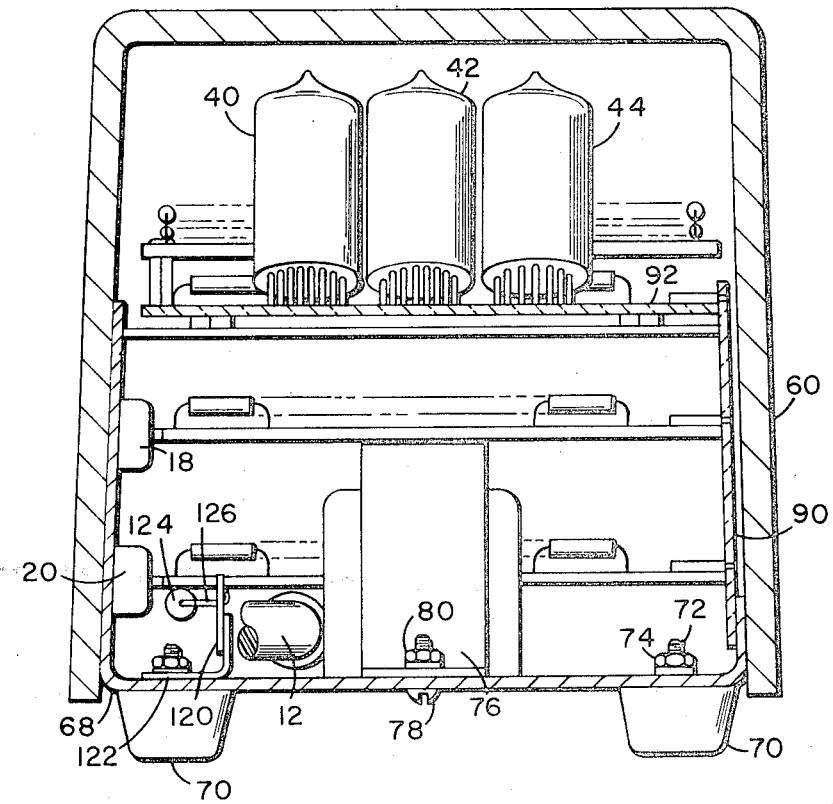
FIG. 5 shows a cross-sectional view of the invention along line 5—5 of FIG. 2; and, FIG. 6 shows a partially representative schematic view of the circuitry of this invention.

Conduction through the body is performed by a connection such as a wrist strap 28 wrapped around a user's wrist 30 having a wire 32 connected thereto for the transmission of a signal from a jack 34. The sensitivity of the jack connection 34 and signal level is adjusted by means of a potentiometer connected to a knob 37. When a wire is contacted at random, the designation of the predesignated wire on a numerical basis is displayed through an opening 38 by way of numeric display tubes. The numeric display tubes can be provided as a hundreds tube 40, a tens tube 42 and a units tube 44 as shown in FIG. 5, which represents a detector capable of detecting wires in a bundle of 100 or more.

In order to detect and display a particular designated wire, a set of switches are utilized so that all other portions of the encoding circuitry which would display the wires at random are clamped down, thereby allowing only one particular predesignated wire to be displayed. The switches utilized for a display of only one preselected wire shall be referred to as the selector switches and incorporate a standard wiper switch known in the art. In order to select a specific numerically designated symbol incorporating hundreds, tens or units, by way of the respective switches clamping down the unsought numerical circuitry, the respective selector switches 46, 48 and 50 are provided.

To facilitate ease of operation of the detector between a random or discrete wire search operation, a mode switch 52 is provided. The modes provided by switch 52 allow for a random detection of the wires in a bundle; the selective detection by way of the selector switches 46, 48 and 50; or a display of the selector switch settings. For further ease of operation, a random switch 54 and a selector display switch 56 which comprise push buttons that function only when depressed are provided. The push buttons allow the random or selector display capability of the device to function without the necessity of turning the mode selection switch 52.

Figure 3:
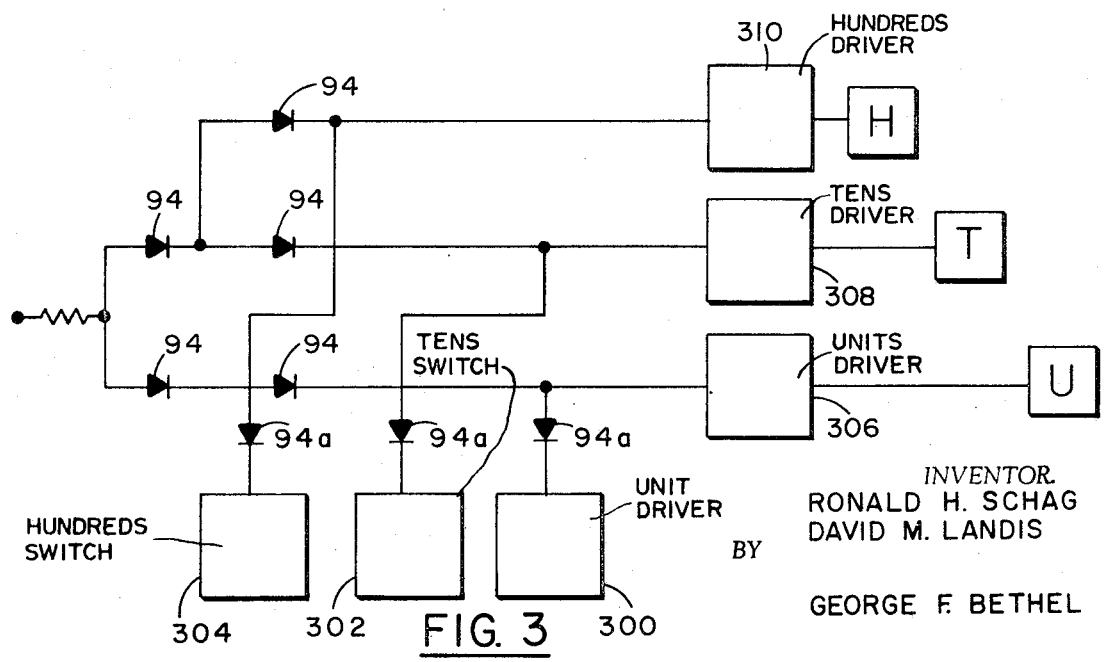
FIG. 3 shows a block diagrammatic representation of the selector capability and circuitry of this invention.
Figure 6:
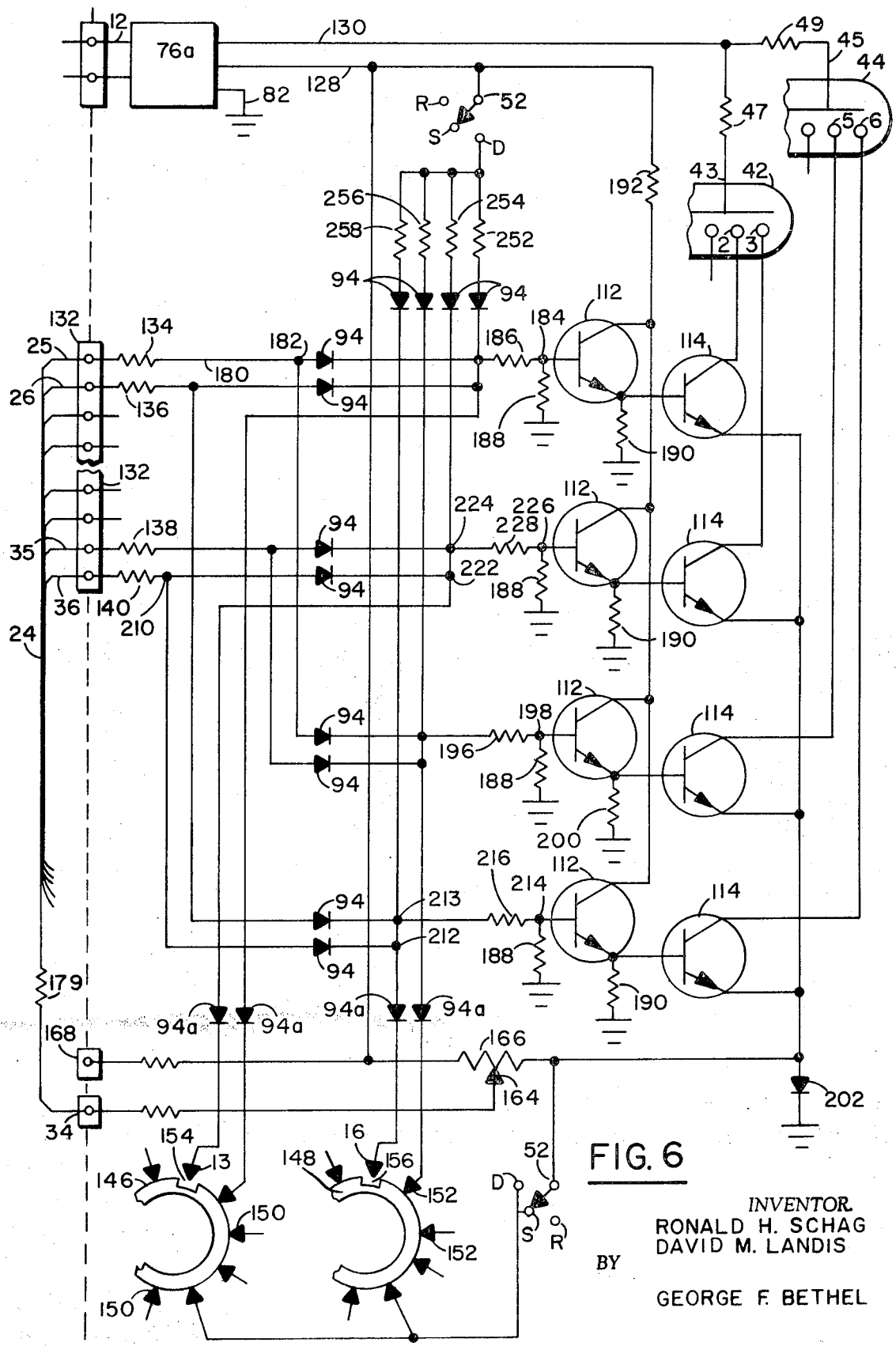

Explanation will now be more specifically directed toward the remaining figures of the drawing as they relate to not only the support apparatus and configuration of the specific embodiment shown, but also the exemplary schematic drawings of FIGS. 3 and 6.

A casing 60 is shown made for a steel or plastic molding. The opening 38 in the case has a bezel glass 62 for viewing the display. The bezel glass 62 is maintained in place by a bezel plate 66 surrounding the bezel glass 62. Interiorly of the casing 60 is a chassis 68 which is secured to the casing 60 by means of screws or any other suitable connection. The chassis 68 has rubber cushions 70 upon which it rests. The rubber cushions 70 are secured to the chassis 68 by means of bolts 72 having nuts 74 (see FIG. 5) threaded thereover for securing the cushions 70 to the chassis.

The chassis 68 serves to support the various circuit boards which shall be described as well as the other components of this invention. In order to utilize the power from the line 12 coming into the detector, a power transformer 76 is interconnected between the line 12 and circuitry. The power transformer 76 is in part secured to the chassis by way of a screw 78 and nut 80 thereover. A power supply 76a (see FIG. 6) comprising the power transformer 76, a rectifier as well as other components to properly bias the active electronic elements of the circuit. The power supply 76a provides power for the numeric display tubes and the active components on lines 130 and 128 of the circuitry with reference to a circuit ground 82. In order to show a display, three numeric display tubes 40, 42 and 44 (see FIG. 5) are provided which are connected to register predesignated numeric symbols of the wires in a cable.

Figure 2:
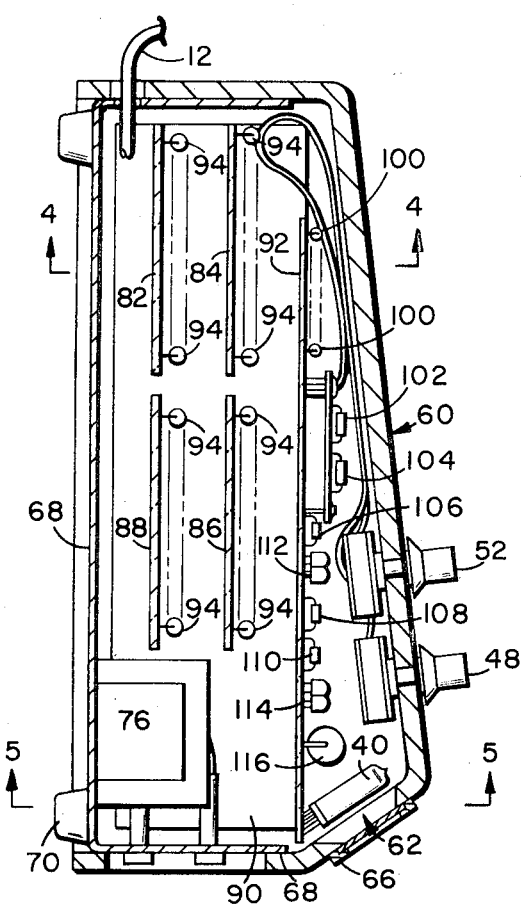
FIG. 2 shows a cross-sectional mid-line view of the invention along line 2—2 of FIG. 1.
Figure 4:
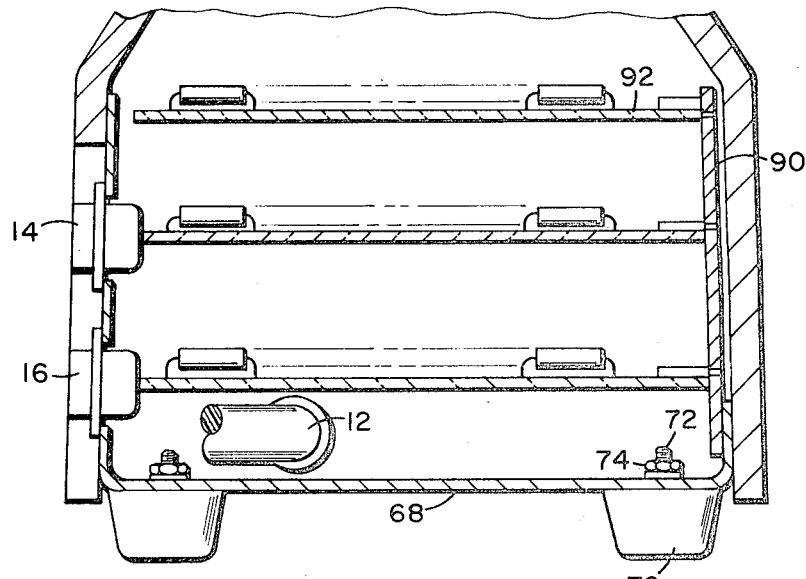
FIG. 4 shows a cross-sectional view of the invention along line 4—4 of FIG. 2.

In order to display the numeric designations or any other predesignated symbols on the tubes 40, 42 and 44, the following apparatus is utilized. In an embodiment, which is not represented by the schematic representation of FIG. 6, for purposes of explanation, four matrix boards 82, 84, 86 and 88 (see FIG. 2) are provided. The four matrix boards 82, 84, 86 and 88 are connected to input connection sockets 14, 16, 18 and 20. The input connection sockets 14, 16, 18 and 20 are such that they can receive a 50-pin connector 22 inserted therein. The matrix boards are serviced by a mother board 90 which is connected to a driver board 92. The driver board 92 (see FIG. 4) as will be explained in the exemplary circuit in FIG. 6 serves to drive the numeric display representations of the tubes 40, 42 and 44.

The matrix boards 82, 84, 86 and 88 generally comprise a plurality of signal diodes 94 which serve to encode a specific signal for a readout on the display tubes 40, 42 and 44. The sockets 14, 16, 18 and 20 which receive the respective plugs 22 connected to the wires 24 that are to be identified, are connected to each one of the diodes of the matrix boards in the manner shown in FIG. 6. The encoding provided by the circuitry in FIG.

6 will be expanded upon. However, in the meantime, it is sufficient to say that the encoded signal from the connection provided by the connection sockets 14, 16, 18 and 20 are discrete signals sent to the driver board 92 which causes the tubes 40, 42 and 44 to identify and display the proper designation of the wire 26 within the bundle or cable 24.

The driver board 92 comprises a series of secondary encoding diodes 100 which are in turn connected with a piggyback board consisting of display and clamping diodes 102 and resistors 104 to the other portions of the circuit comprising resistors 106 which are utilized for current balance in the circuit, and resistors 108 and 110 which return to circuit ground to provide a leakage return path for the transistors of the circuit. The driving portion of the system comprises a first input transistor 112 connected to an output transistor 114 which directly drives each portion of the numeric display tubes 40, 42 and 44. Power for the foregoing numeric display tubes 40, 42 and 44 is supplied by an electrolitic capacitor 116 which acts as a ripple filter for rectified AC power from the transformer 76.

In order to properly supply the detector 10 with the power from line 12, a strip or tie point 120 is utilized (see FIG. 5). The strip or tie point 120 is attached to the chassis 68 with a metal strapping 122 secured to the screw 72 by a nut 74. To adequately limit the incoming source of power delivered by the line 12, a fuse 124 is connected in series with the high side of the line by a connection 126 thereacross.

Looking more specifically at the exemplary schematic of FIG. 6, it is seen that the power is introduced in the form of usable DC potentials across the lines 128 and 130 with respect to circuit ground 82. For purposes of illustration a connector plug 22 is shown partially broken out in fragmented form as a connector strip 132. The connector strip 132 is in effect a portion of the input plug 22 having a plurality of wires 24 attached thereto. The connector strip 132 has a series of terminals which would normally be a plug 22 inserted into one of the sockets 14, 16, 18 and 20. The cable 24 has a series of wires, and for this example the wires of the cable 24 shall be predesignated with symbols and identified as having wires 25, 26, 35 and 36. It should be understood that in the detector exemplified by the circuitry of FIG. 6, utilizing two tubes 42 and 44, that only up to 99 wires can be detected and identified.

Leading from the connection strip 132, a series of resistors for each line 134, 136, 138 and 140 are provided, to limit the current in those lines.

In order to encode or operate the circuitry of the detector 10, a driver scheme is utilized which incorporates input transistors 112 and output transistors 114. The input transistors 112 and output transistors 114 are connected to the cathodes of the numeric display tubes 42 and 44 through the collector of each respective output transistor 114. The cathodes of the numeric display tubes 42 and 44 are designated with the respective symbols that they represent. The numeric display tube 42 serves to display the tens decade whereas tube 44 serves to display the units decade. The designated symbols shown for purposes of illustration of the tens tube 42 are 2 and 3, and those of the units tube 44 are 5 and 6. The foregoing cathodes for displaying the numerals 2, 3, 5 and 6 are connected to the appropriate collectors of the output transistors 114 whereby the DC potential on line 130 through appropriate limiting resistors 47 and 49 produce the necessary anode potentials at points 43 and 45. Thus, the cathode elements 2, 3, 5 and 6 display the appropriate numeric symbolism when the respective associated input line 25, 26, 35 or 36 receives a signal.

Looking more specifically at the selector switches of the device, two switches 46 and 48 of the device are shown with their respective wiper plates 146 and 148 shown in FIG. 6. The wiper plates 146 and 148 contact a series of wiper contacts 150 and 152. The wiper contacts 150 and 152 are each connected to the encoding lines symbolizing wires within the cable 24. Each wiper plate 146 and 148 has a peripheral gap 154 and 156, respectively thereon so that it effectively bypasses the one wiper contact than aligned with each of the gaps 154 and 156. Thus, in the selective detection mode of operation, one of the wiper contacts is out of contact with the wiper plates 146 and 148.

When a user desires to determine at random which wire in the bundle 24 he is contacting, he turns the mode switch 52 to the position for random display indicated by the letter R on switch 52. When a user desires to locate a particular wire designation which has been chosen by virtue of the switches 46 and 48 clamping down all but the wire being searched for, the user turns the switch to the search position designated by S on switch 52. In order to effectively display the specific numerical designation to which the switches 46 and 48 have been dialed to, it is necessary to turn the switch 52 to the display position indicated by D. The display position shows the numerically designated position to which the switches 46 and 48 have been moved by virtue of the fact that the gaps 154 and 156 in the wiper plates 146 and 148 permit the respective designated symbol to be displayed through the use of the alternative circuit providing current to the drivers as will be described.

As a specific illustration, when a user desires to determine at random which particular wire bearing a numerical designation 26 in a group of wires he has contacted with his finger or other device, he switches the mode switch 52 to the random mode R. When the mode switch 52 is switched to the random mode R, the selector switches 46 and 48 with the plates 146 and 148 are bypassed. Thus, when the user contacts the wire 26 with his index finger as shown in FIG. 1, a current originating from the output jack 34, passes through the wire 32, the wrist strap contact 28 and the hand of the user thereby entering the wire 26. The current passes through wire 26 to connector strip 132 and the output from connector strip 132, limited by resistor 136 is passed to a diode 94. The signal current is then encoded through the diodes 94 and amplified by transistors 112 and 114 to operate the numeric display tubes 42, 44 for a display of the designation of the wire so contacted, in this case the wire designated 26.

The sensitivity of the system can be adjusted by turning the knob 37 which serves to cause a potentiometer wiper 164 to move across a resistance 166 thereby creating a variable source potential for jack 34. If the user cares to, he can plug into the jack 168, which is connected directly to the source potential for the sensitivity control, thus eliminating such control.

RANDOM OPERATION

When the circuit is in the random mode by virtue of the switch 52 being turned to the open position as indicated by the letter R, the operative characteristics and apparatus to drive the numeric display tubes 42 and 44 function as follows. If wire 25 is touched by a user thereby completing a loop through his body, exemplified by a resistance 179, an input current is received on line 180. The input current on line 180 is bifurcated at connection point 82 by virtue of the balancing resistors 186 and 196 which equalize the branch impedance. It should be understood that the amount flowing in each line after bifurcation of the current is a function of the diode, line and component characteristics. The bifurcated signal is received by input transistors 112 at points 184 and 198. The input transistors 112, connected to points 184 and 198 are provided with balanced currents through resistors 186 and 196 and biased by resistors 188 and 190, and 188 and 200 respectively. The collectors of all of the input transistors 112 are biased through a resistor 192. The emitter side of the input transistors are connected to the bases of their respective output transistors 114. In this specific case relating to the operation of the invention with respect to the identification of the wire designation 25, the collectors of the output transistors 114 are connected to cathode number two of the numeric display tube 42 and number five of the numeric display tube 44. Thus, when a current is received on line 180 and bifurcated at point 182, points 184 and 198 receive the split current which is amplified by the respective input and output transistors 112 and 114 connected to points 184 and 198, thereby producing a display of two in the tens tube 42 and five in units tube 44.

The foregoing circuit is biased at the emitters of the respective output transistors 114 by a diode 202 which is connected to circuit ground.

In summation, a readout of the wire sought to be identified is provided when the switch 52 is in the random mode R. The identified readout is provided by the signal diodes 94 connected to appropriate drivers in the form of the transistors 112, 114 to effectively cause the tens and the units cathodes of the numeric display tubes 42 and 44 to be illuminated.

SEARCH OPERATION

The exemplary schematic of FIG. 6 shows switch 52 in the search position, S. Thus, when a particular wire designation is sought, by way of the selector switches 46 and 48 being dialed to a specific wire designation, all other display designations on the numeric display tubes 42 and 44 will not display, and only the specific wire being sought will have its designation appear on the numeric display tubes. The foregoing function is provided by the circuit clamping action of the switches 46 and 48 which effectively cause all but the specific wire designation sought, to be eliminated from the display circuitry.

The search mode utilizes gaps 154 and 156 on the wiper plates 146 and 148 to remove from contact, the wiper contacts 13 and 16 respectively. The wiper contacts 13 and 16 which are not in contact with the plates 146 and 148 specifically in this case represent a tens three and a units six.

Looking more specifically at a wire in the bundle or cable 24 which is designated 36 it can be seen that the signal therefrom is bifurcated at point 210. One line to which the bifurcated signal flows is connected to point 212 which is in turn connected to the units six wiper contact 16 through a diode 94a. The line connecting the wiper contact 16 is adjacent the space 156 of the wiper plate 148. The point 212 is also connected to point 213 which allows a signal to be received at point 214 through a current balancing resistor 216. The signal at point 214 is impressed on the base of the input transistor 112 connected thereto. The emitter of the output transistor 114 connected to the selected input transistor 112 is biased by diode 202 to circuit ground. The collector thereof is connected to the units six designated 6 of the numeric display tube 44 to indicate a display thereof.

The signal which is bifurcated at point 210, is also received at point 222 where the current has two alternative routes to travel. If the tens three were clamped to the wiper plate 146 by its wiper 13 being placed in contact therewith, the entire input current would pass from point 210 through a diode 94 to point 222, through a diode 94a and then to the wiper plate 146 which is connected to the bias diode 202 through mode switch 52. However, inasmuch as an adjacent portion of the wiper plate 148 is open at point 154, the current will be properly bifurcated and the appropriate portion will enter point 224 and thereafter to point 226 through resistor 228.

Point 226 is connected to the base of an input transistor 112. The collector of the input transistor is biased through resistor 192 as in the case of the other input transistors 112, and the emitter thereof is connected to the base of an output transistor 114. The collector of the output transistor is connected to the tens three of the numeric display tube 42 which is lit when line 36 in the foregoing search mode example is contacted.

When wire 36 is connected and contacted by a user's finger as shown in FIG. 1, the numeric display tubes 42 and 44 indicate the display of a 36 thereon. Thus, one can contact the ends of the complete bundle of wires 24 with his hand and an indication of a specific wire will not be displayed until that wire which has been indicated by the placement of the switches 46 and 48 is contacted. In this case, the switches 46 and 48 have been turned to a tens three and a units six thereby indicating a 36 as the wire to be searched for. Upon the wire being contacted, the numeric display tube 42 and 44 display that particular wire designation.

DISPLAY MODE

It is sometimes desirable to place numeric designations on the periphery of the switches 46, 48 and 50, in order to indicate to the operator the specific position of the switches. However, as can be appreciated, when an operator is concerned with looking at the specific dial placement of each particular switch 46, 48 and 50 it is difficult to determine exactly what designations switches are set to. Therefore, this invention provides what is known as a display mode effectuated by turning the mode switch 52 to the D position. When the switch is in the D position it causes the invention to show the designation to which the switches 46 and 48 have been dialed.

An example of the foregoing is when the switches 46 and 48 have been dialed into the positions as shown whereby a tens three and a units six is set thereon. When the switches 46 and 48 are in that position, and the mode switch 52 is in the D or display position, the tens three and the units six will be displayed on the numeric display tubes 42 and 44. This is by reason of the fact that the current is permitted to flow from power supply 76a via mode switch 52, through the resistors 252, 254, 256 and 258 which are connected to their respective signal diodes 94. In this position all currents will flow through the wiper contacts 150 and 152 by virtue of being in contact with wiper plates, 146 and 148, except for wiper contacts 13 and 16 adjacent gaps 154 and 156 in the respective wiper plates. Thus, the current which is received through the resistors 254 and 258 will not flow to the circuit ground via divide 202 but will flow to points 226 and 214 whereby a tens three and a units six will be displayed as a 36.

The display setting "D" of the dials 46 and 48 vastly increase the facility to operate the invention so that one does not have to look at the dial setting, or placement of the switches 46 and 48. In effect one merely has to look at the bezel glass 62 to determine where the placement of the switches are, as to a particular designation of a wire to be detected thereby.

The foregoing illustration of the specific embodiment of this invention has illustrated only a units and tens system. Thus, the embodiment is only able to detect wires within a units and tens series of connections. As can be appreciated, this invention can incorporate a series of matrixes utilizing another series of drivers and particular circuitry to increase the reading from a units and tens series up to a units, tens and hundreds series or higher. In FIG. 3 a scheme for this utilization is shown incorporating a units switch 300, a tens switch 302 and a hundreds switch 304. The units, tens and hundreds switches 300, 302 and 304 are respectively connected through the signal diodes 94a to drivers 306, 308 and 310 which respectively drive the numeric display tubes U, T and H for the respective units, tens and hundreds displays. The system effectively incorporates signal diodes 94 to encode the signal flow through the circuit in an analagous manner as the scheme of FIG. 6. Furthermore, diodes 94a are utilized in an analagous manner as in FIG. 6 to effectuate the selective and display modes as provided by switch 52.

The switching scheme provided by the switches 46, 48 and 50 may be replaced by an electronic scanner which is capable of scanning sequentially across all wires and stopping on any line that has a signal on it. Such a scanner may be preset to a particular number and advanced either up or down from that number by a foot switch, or other suitable switching means.

The foregoing specification contains a written description of the invention and of the manner of making and using it in full, clear, concise and exact terms to enable anyone skilled in the art to which it pertains to make and use the same, as well as setting forth the best mode contemplated by the inventors for carrying out the invention. However, the invention should not be limited by the foregoing specification. Instead, the scope and spirit of the invention should only be read in light of the following claims, which particularly point out and distinctly claim the subject matter of the invention.

We claim:

1. In apparatus for identifying an individual wire in a bundle of wires of the type having connector means for receiving the first ends of the wires in a bundle of wires, encoding means coupled to said connector means for assigning arbitrary identifying indicia to each of the wires of a bundle of wires at said connector means, display means coupled to said encoding means for selectively displaying said arbitrary identifying indicia, and power supply means coupled to said encoding and display means, the improvement comprising: a variable low level signal source coupled to said power supply means for providing a low level signal; probe means coupled to said variable low level signal source for coupling said low level signal to at least a portion of the body of a user for the selective transmission of said low level signal through the body of a user to selective wires in said bundle touched by the body of the user to render the body an extension of said probe means; means for selectively varying the level of said variable low level signal source; said encoding means being arranged to detect the presence of said low level signal upon the completion of a closed circuit path from said low level signal source, through, said probe means, the body of a user, at least one wire in a bundle of wires, and said connector means to said encoding means wherein when a portion of the body of a user is brought into contact with the second end of a wire, a closed current conducting path is established from said variable low level signal source, through said probe means, the body of a user, a wire in a bundle of wires and said connector means to said encoding means to cause the arbitrary identifying indicia assigned to such wire to be displayed; selectively operable selection means coupled to said encoding means to permit said encoding means to operate only with the selected arbitrary identifying indicia and suppressing all others wherein only a selected arbitrary identifying indicia is displayed by said display means when said current path is completed employing the individual wire in the wire bundle assigned the selected arbitrary identifying indicia; and a multi-position mode selection switch coupled to said power supply, said selection means and said encoding means, said mode selection switch having a first position disabling said selection means to permit the arbitrary identifying indicia of any wire completing the current path to be displayed and a second position selectively disabling said encoding means to permit the arbitrary identifying indicia of only a selected wire to be displayed when it completes the current path.

2. The improvement as defined in claim 1 wherein said multi-position mode selection switch has a third position uncoupling said probe means from said power supply to display the arbitrary identifying indicia to which said selection means has been operated.

3. The improvement as defined in claim 1, wherein said probe means further comprises: electrode means arranged for intimate contact with the skin of the body of a user for impressing thereupon said low level signal; coupling means for coupling said electrode means to the skin of the body of a user; and conductor means coupled to said variable low level signal source and said electrode means for conducting said low level signal from said variable low level signal source to said electrode means.

4. The improvement as defined in claim 1 wherein said probe means further comprises: a conductive electrode means arranged for intimate contact with the skin of the body of a user for impressing thereupon said low level signal; an insulating strap coupled to said electrode means for attachment about the wrist of the user to render the skin of the user from the wrist to the finger tips selectively conductive of said variable low level signal; and conductor means coupled to said variable low level signal source and said electrode means for conducting said low level signal from said variable low level signal source to said electrode means.

5. The improvement as defined in claim 1, wherein said variable low level signal source is a high frequency signal source; and said probe means further comprises electrode means arranged for intimate contact with the skin of the body of a user for impressing thereupon a low level high frequency signal generated by said high frequency signal source, coupling means for coupling said electrode means to the skin of a user, and conductor means coupled to said variable low level, high frequency signal source and said electrode means for conducting said low level, high frequency signal from said variable low level, high frequency signal source to said electrode means rendering said portion of the body of a user a capacitive probe.

6. The improvement as defined in claim 1, wherein said encoding means is a matrix comprising: a plurality of input lines, one for each of the wires of a bundle of wires, coupled to said connector means; ten units output lines, one for each of the digits zero to nine; ten tens output lines, one for each of the digits zero to nine; and selective coupling elements coupled between said input lines and said ten units and ten tens output lines whereby current on each of the input lines is encoded as current on at least one of said units and one of said tens output lines.

7. The improvement as defined in claim 6, further comprising ten hundreds output lines, one for each of the digits zero to nine; and additional selective coupling means coupled between said input lines and said hundreds output lines whereby current one each of said input lines is encoded as current on at least one of said units, tens and hundreds output lines.

8. The improvement as defined in claim 1, wherein said display means comprises at least two numerical display tubes.

9. The improvement as defined in claim 6, wherein said display means comprises: two numerical display tubes, a first displaying the units digits and the second displaying the tens digits; first coupling means coupling each of said ten units output lines of said encoding means to a corresponding input of said units digit display tube and second coupling means coupling each of the ten tens output lines of said encoding means to a corresponding input of said tens digit display tube whereby two decade numerical identifying indicia may be displayed when said current path is completed.

10. The improvement as defined in claim 7, wherein said display means comprises: three numerical display tubes, a first displaying the units digits, a second displaying the tens digits and the third displaying the hundreds digits; first coupling means coupling each of said ten units output lines of said encoding means to a corresponding input of said units digit display tube; second coupling means coupling each of said ten tens digit output lines of said encoding means to a corresponding input of said tens digit display tube and third coupling means coupling each of said ten hundreds digit output lines of said encoding means to a corresponding input of said hundreds digit display tube whereby three decade numerical identifying indicia may be displayed when said current path is completed.

11. Apparatus for finding selected wires in a bundle of wires comprising connector means for receiving the first ends of the wires in a bundle of wires;

encoding means coupled to said connector means for assigning arbitrary identifying indicia to each of the wires of a bundle of wires received at said connector means;

display means coupled to said encoding means for selectively displaying said arbitrary identifying indicia;

power supply means coupled to said encoding and display means;

a low level signal source coupled to said power supply means for providing a low level signal;

probe means coupled to said low level signal source to supply said low level signal to the second ends of the wires in a bundle having the first ends received at said connector means; said probe means including electrode means receiving said low level signal and means for securing said electrode means to the body of a user to permit said low level signal to pass through the body of a user to the second ends of the wires of a bundle of wires having the first ends received at said connector means to render the body of a user an extension of said probe means;

said encoding means detecting the presence of said low level signal upon the completion of a circuit path from said low level signal source through said probe means, the body of a user, the wires in a bundle and said connector means to said encoding means; and selectively operable selection means operable by a user to select arbitrary identifying indicia for a wire to be found, said selection means being coupled to said encoding means to inhibit operation of said encoding means with respect to said arbitrary identifying indicia other than said selected arbitrary identifying indicia to render said display means operable to display only said selected arbitrary identifying indicia whereby a user can use the fingers of a hand to touch the second ends of the wires of a bundle and said display means is operated only when a wire having said selected arbitrary identifying indicia assigned thereto is touched by the user to complete a circuit path from said low level signal source through said probe means, the body of the user and said connector means to said encoding means.

12. The apparatus as recited in claim 11 wherein said securing means including a strap carrying said electrode means for securing said electrode means to the body of a user in intimate contact with the skin.

13. The apparatus as recited in claim 11 wherein said low level signal source provides a low level, high frequency current, said securing means includes a strap carrying said electrode means for coupling said electrode means to the skin of a user, and said probe means includes conductor means coupled to said low level signal source and said electrode means for conducting said low level, high frequency current from said low level signal source to said electrode means rendering the body of a user a capacitive probe.

14. A method of identifying wires in a bundle of wires comprising the steps of connecting a first end of each of the wires in the bundle with electrical equipment including display means and encoding means, the encoding means connecting each of the wires to the display means such that the display means is operable to display arbitrary identifying indicia for each wire;

supplying a low level current from the electrical equipment to the body of a user;

touching second ends of the wires in the bundle with the fingers of a hand of the user to supply the low level current through the body of the user and the touched wires to the encoding means; and displaying the arbitrary identifying indicia for each touched wire on the display means.

15. A method for finding selected wires in a bundle of wires comprising the steps of connecting a first end of each of the wires in the bundle with electrical equipment including display means and encoding means, the encoding means connecting each of the wires to the display means such that the display means is operable to display arbitrary identifying indicia for each wire;

selecting arbitrary identifying indicia assigned to a wire to be found;

inhibiting operation of the encoding means with respect to arbitrary identifying indicia other than the selected arbitrary identifying indicia so that only the selected arbitrary identifying indicia can be displayed by the display means;

supplying a low level current from the electrical equipment to the body of a user;

simultaneously touching second ends of a plurality of the wires in the bundle with the fingers of a hand of the user to supply the low level current through the body of the user and the plurality of touched wires to the encoding means; and displaying the selected arbitrary identifying indicia only when the wire having the selected arbitrary identifying indicia assigned thereto is touched by the user.

* * * * *